United States Patent [19]

Sinclair et al.

[11] 3,913,939
[45] Oct. 21, 1975

[54] VARIABLE HEIGHT AND VARIABLE SPRING RATE SUSPENSION SYSTEM

[75] Inventors: Alex H. Sinclair, Southfield; Robert J. Otto, Grosse Pointe Woods, both of Mich.

[73] Assignee: The United States of America as represented by the Secretary of the Army, Washington, D.C.

[22] Filed: July 2, 1973

[21] Appl. No.: 376,023

[52] U.S. Cl. ............... 280/124 F; 180/9.2; 60/386
[51] Int. Cl.² ........................................ B60G 25/00
[58] Field of Search ................. 180/9.2, 41–52; 280/124 F, DIG. 1, 6 H, 6.1; 305/27; 60/386, 403, 404

[56] References Cited
UNITED STATES PATENTS

| | | | |
|---|---|---|---|
| 2,405,733 | 8/1946 | Boldt | 180/9.2 |
| 2,606,759 | 8/1952 | Colby | 267/57 |
| 3,371,940 | 3/1968 | Sinclair et al. | 180/9.2 X |
| 3,477,339 | 11/1969 | Lundin et al. | 180/9.2 X |
| 3,556,242 | 1/1971 | Dollase | 60/386 X |

Primary Examiner—Robert B. Reeves
Assistant Examiner—Joseph J. Rolla
Attorney, Agent, or Firm—John F. Schmidt; Peter A. Taucher; Robert P. Gibson

[57] ABSTRACT

A vehicle on tracks has a torsion bar and tube suspension for a variable spring rate, and the torsion bar anchor is pivotable to rotate the road arms of the wheels to vary ground clearance. Hydraulic rams, one for each side, have piston rods that are seized at zero pressure for "fail-safe" characteristics. System pressure is applied through solenoid valves to remove the grip on the piston rods. Primary hydraulic pressure depends on an engine-operated pump, but the driver can operate an emergency pump to control vehicle height. If electric power to the solenoid valve fails, the operator controls other valves to bypass the electrical system controls.

12 Claims, 9 Drawing Figures

Fig-2

VARIABLE HEIGHT AND VARIABLE SPRING RATE SUSPENSION SYSTEM

The invention described herein may be manufactured, used, and licensed by or for the Government for governmental purposes without payment to us of any royalty thereon.

BACKGROUND OF THE INVENTION

1. Field of the Invention

The invention pertains to wheeled vehicles adapted to operate off-highway, and especially to military vehicles in the track-laying category, such as tanks, gun carriages, personnel carriers, cargo carriers, and the like.

Equipment of the type listed above will usually share most of the following desired characteristics:
  a. Off-highway capabilities;
  b. Operate under enemy surveillance and therefore subject to enemy fire, land mines, and the like;
  c. High speed capability;
  d. High flotation;
  e. Reliability.

To some extent, the listed characteristics conflict with each other, as is well known to those skilled in the art. Thus, a tank in a combat area should preferably exhibit a very low profile, both to minimize chances of detection before engaging the enemy and to present as small a target as possible during actual combat. One means used to achieve a low profile is minimum ground clearance. However, a tank hull that operates close to the terrain surface is virtually certain to encounter difficulties with such obstacles as rocks, stumps, etc, and operation of such a vehicle cross-country at high speed is likely to be extremely hazardous.

By "high flotation" as here used, we mean easy negotiation of adverse terrain such as swamps, mud, sand, snow and the like, for which the vehicle tracks should operate at a minimum ground contact pressure, and the vehicle should have maximum ground clearance to minimize the drag of the hull. Such maximum ground clearance in a fixed vehicle design conflicts with the requirement that the tank or other vehicle have a low profile.

It will be further apparent on reflection that troops operating such equipment in combat are staking their lives on the reliability of the equipment. Since the enemy's objective is the disablement of United States tanks etc, it should be evident that the crew of a tank will appreciate the capability of the vehicle to continue in operation even in the event of minor system failures. Reliability is best attained through simplicity, but simplicity is rarely a characteristic of sophisticated combat equipment. It is accordingly highly desirable to provide troops with sophisticated high-performance equipment that can continue to operate even if minor failures occur, due to enemy action or adverse terrain conditions, or other causes.

2. The Prior Art

The closest prior art known to applicants is:

|   | Patent No. | Patentee(s) | Patent Date |
|---|---|---|---|
| A | 2,405,733 | Boldt | 8-13-46 |
| B | 2,606,759 | Colby | 8-12-52 |
| C | 3,371,940 | Sinclair and Kozowyk | 3-5-68 |
| D | 3,459,439 | Sinclair and Otto | 8-5-69 |
| E | 3,504,930 | Kozowyk, Senecal and Maniker | 4-7-70 |
| F | 3,504,931 | Kozowyk and Sinclair | 4-7-70 |
| G | 3,504,932 | Kozowyk and Sinclair | 4-7-70 |
| H | 3,513,927 | Kozowyk, Sinclair and Green | 5-26-70 |
| I | 3,539,229 | Scully | 11-10-70 |

Applicants are aware that the prior art discloses height control systems and variable spring rate suspensions, but a problem with prior art systems has been the fact that variable spring rate suspensions did not readily and simply adapt themselves to vehicle height control.

SUMMARY OF THE INVENTION

In its broader aspects, the invention is a vehicle wheel suspension system incorporating means to vary vehicle height in an infinite number of increments throughout a range between maximum vehicle height and minimum vehicle height, in combination with means which are elastically deformable and responsive to vehicle load to vary the spring rate of the suspension means. In its more sophisticated aspects, road wheels are mounted on roadarms pivotally carried and connected to torsion bars secured in angularly movable anchors wherein the anchors for all the wheels on one side are linked for simultaneous movement by a fail-safe hydraulic ram, the latter having a piston rod which engages the hydraulic cylinder in an interference fit so long as the hydraulic system is at zero psig; when the system is pressurized, the interference fit is removed and the piston can be moved relative to the cylinder.

The fail-safe feature assures that loss of hydraulic pressure in the primary source will not automatically allow the vehicle to settle to its minimum ground clearance; instead, the ram for each side is held fast in the position it occupies at the time of pressure failure. A second source of hydraulic pressure is provided that is not dependent on the power which drives the primary source pump so that vehicle height can be controlled even without primary source pressure.

Another refinement of a fail-safe or "fall-back" type involves the means for removal of the interference fit referred to, control of which is provided by electrically actuated valve means. If for any reason the electric power line to that means should be cut, the normal operative means to remove the interference would not function. To meet that contingency, still further valve means, operator-operable, are provided to make possible the application of emergency fluid pressure to the fail-safe lock so that the height control rams may be operated.

It is accordingly an object of the invention to provide a vehicle with a simplified and more reliable fail-safe height control of a suspension system which has a variable spring rate; moreover, the system is provided with a plurality of fail-safe features to obviate loss of function of the whole system in the event of inoperativeness of certain component parts thereof.

3 shown in phantom to avoid obscuring the invention itself.

Figure 2:
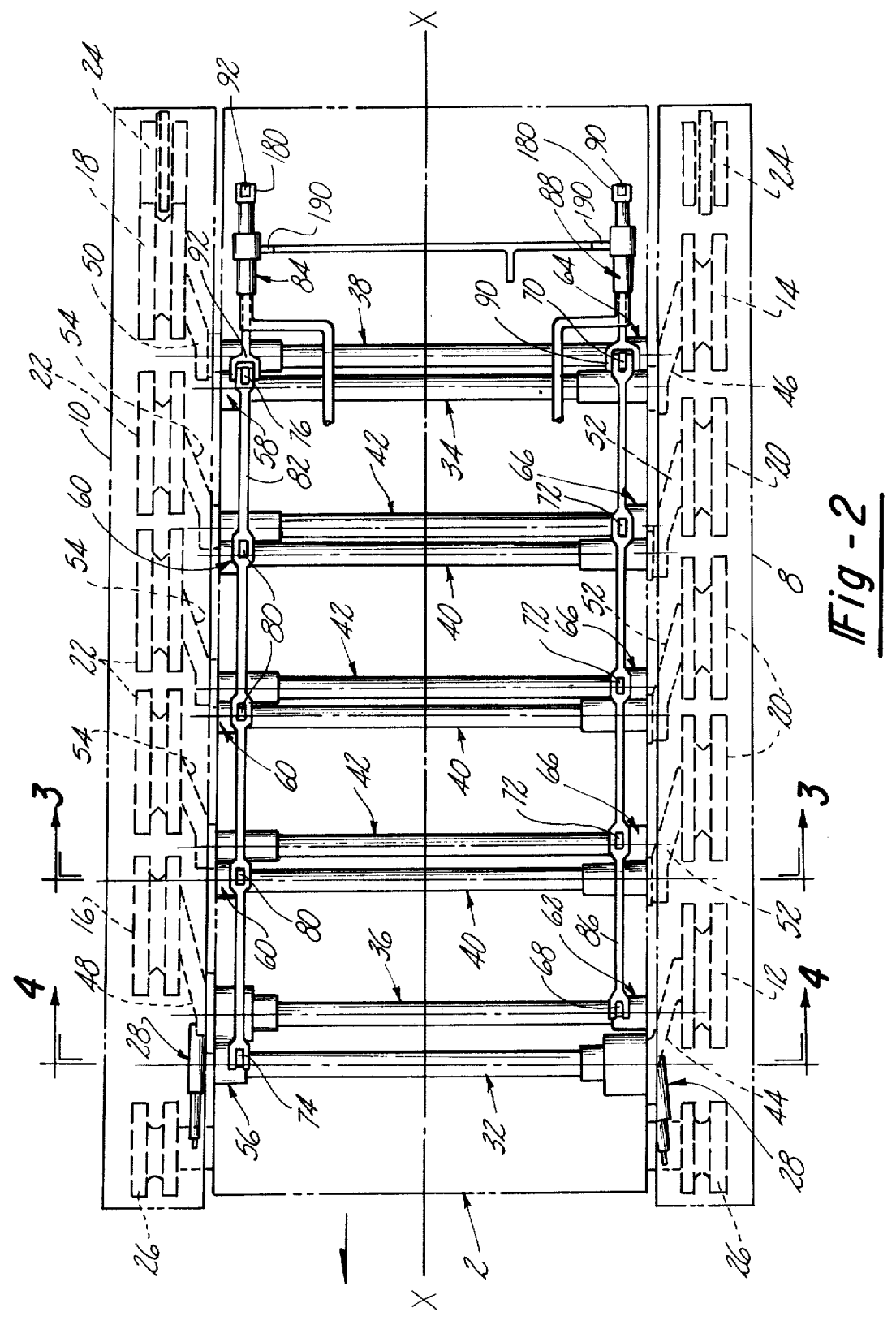

FIG. 2 is a top plan view of the tank of FIG. 1, again with only minimum of conventional structure and much of that in phantom.

Figure 3:
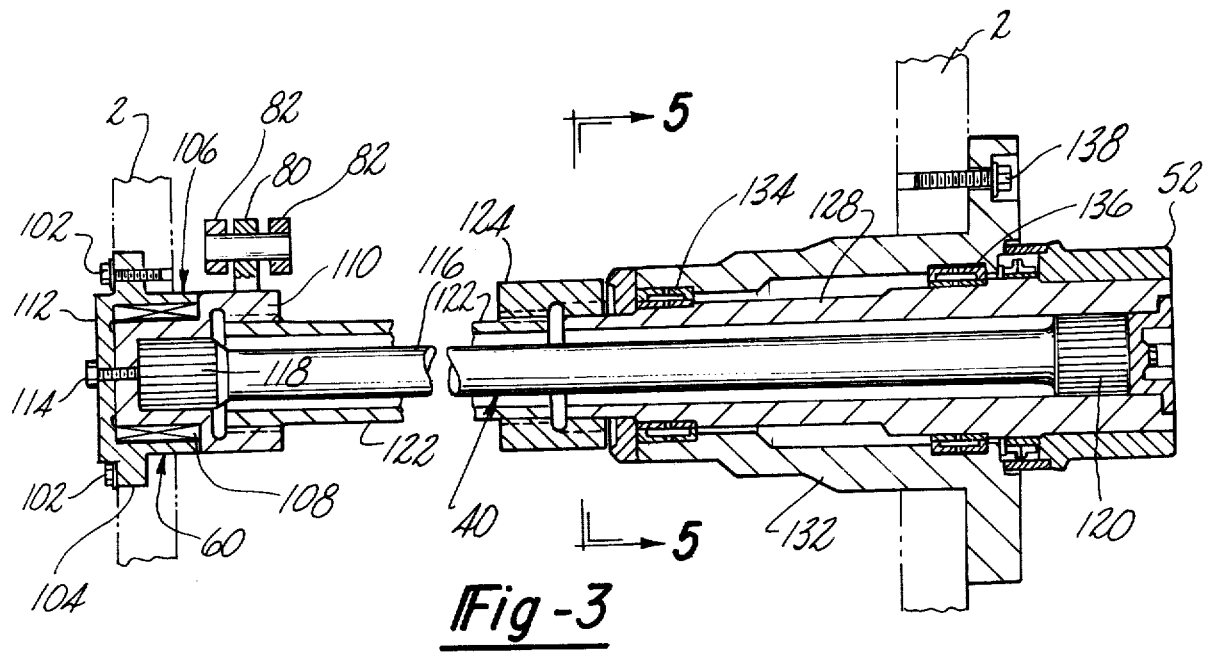

FIG. 3 is a view in section substantially on the plane of line 3 — 3 of FIG. 2.

Figure 4:
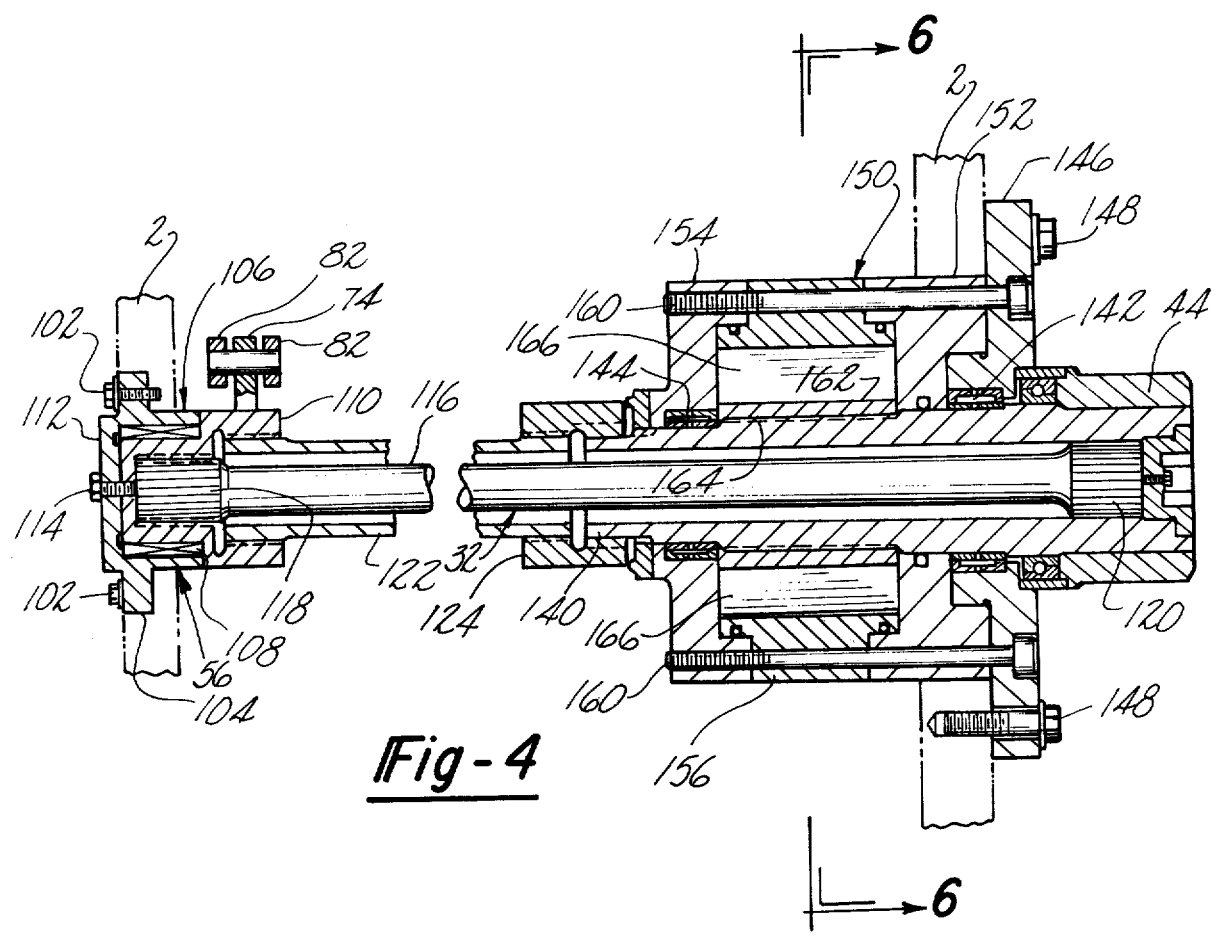

FIG. 4 is a view in section substantially on the plane of line 4 — 4 of FIG. 2.

Figure 5:
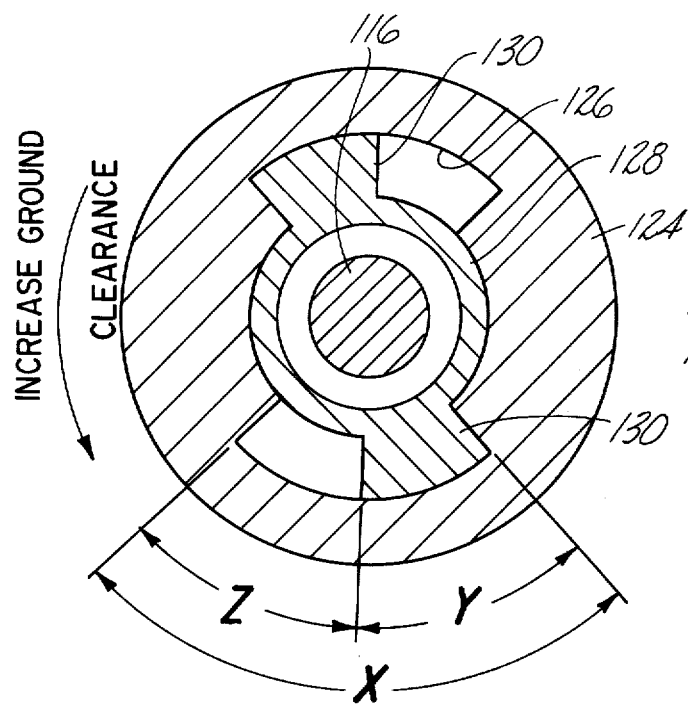

FIG. 5 is a view in section on the plane of line 5 — 5 of FIG. 3.

Figure 6:
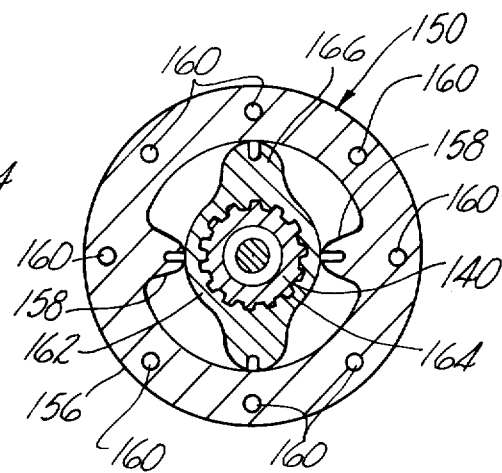

FIG. 6 is a view in section on the plane of line 6 — 6 of FIG. 4.

Figure 7:
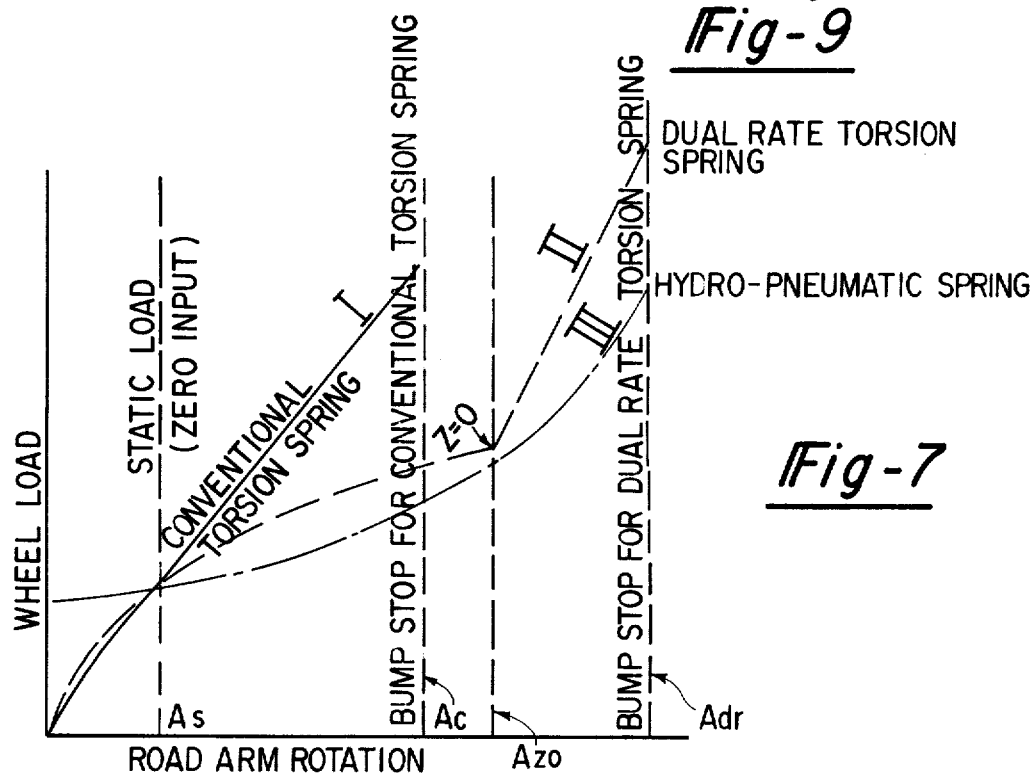

FIG. 7 is a graph of performance curves.

Figure 9:
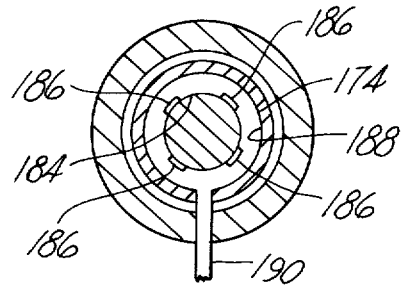
Figure 8:
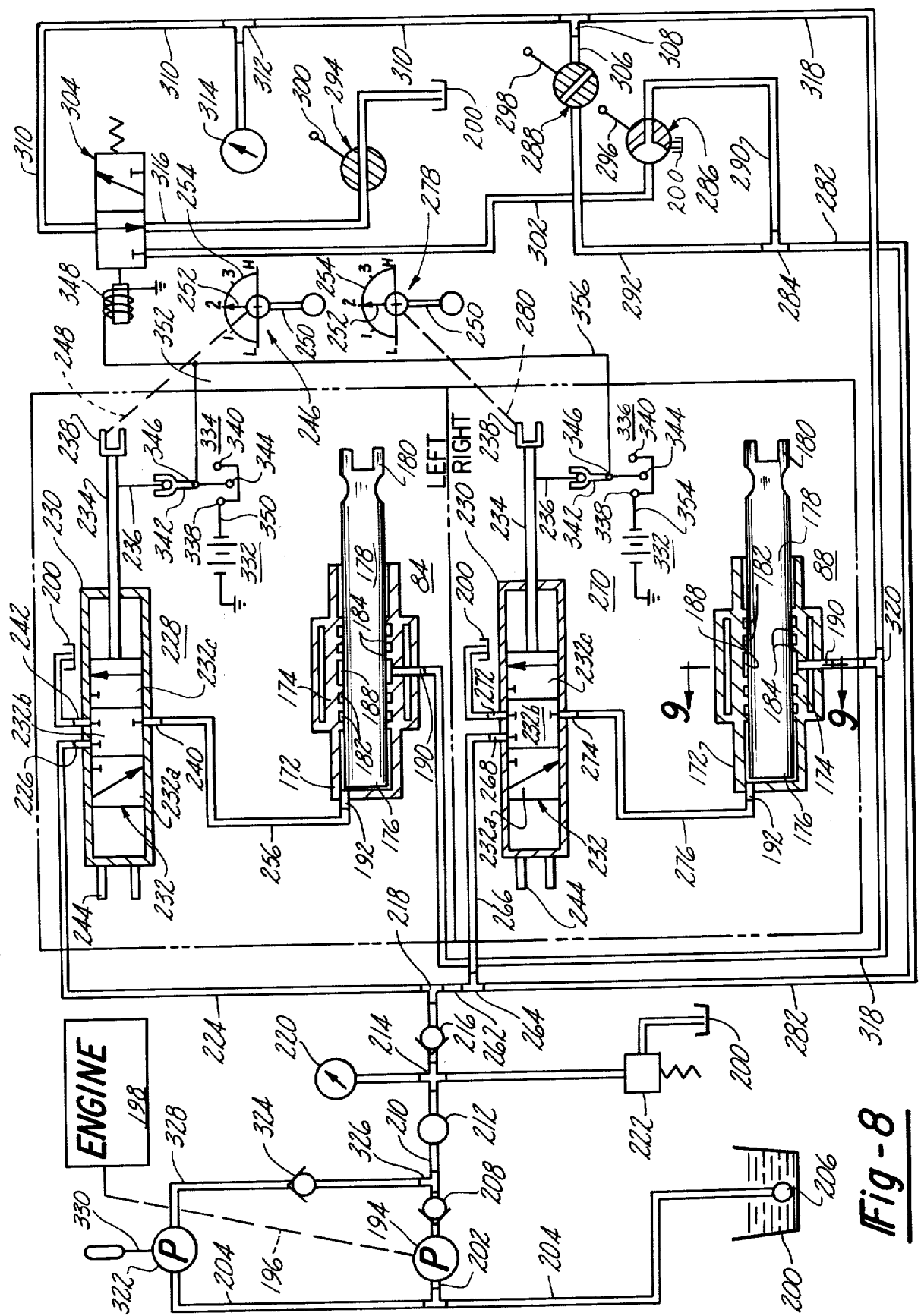

FIG. 8 is a circuit diagram of the combined hydraulic and electrical systems embodied in the invention; and FIG. 9 is a view in section on the plane of line 9 — 9 of FIG. 8.

DESCRIPTION OF A PREFERRED EMBODIMENT

Figure 1:
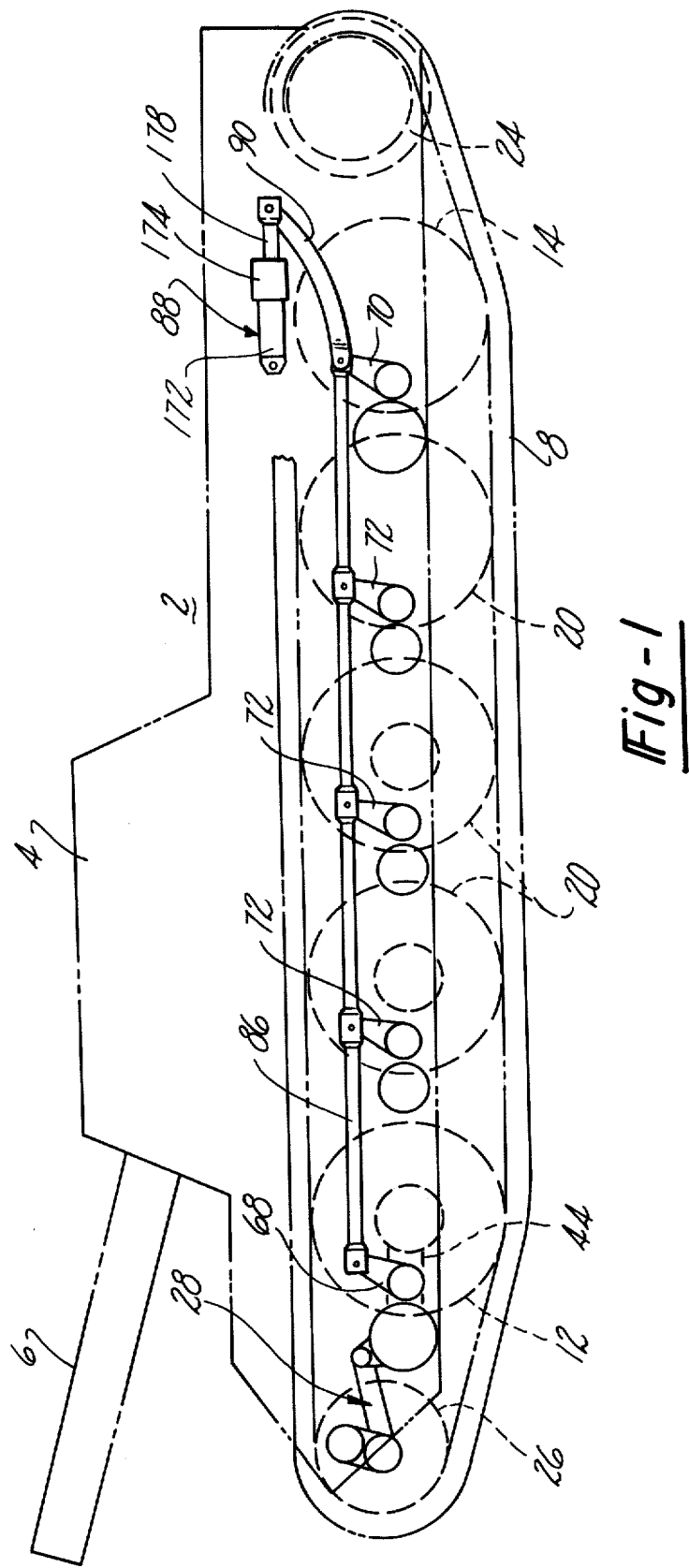
FIG. 1 shows a side view of a military tank equipped with a variable spring rate, variable height suspension system, wherein only so much of conventional structure is shown as is required to illustrate the invention, and even so most of the conventional features are

FIGS. 1 and 2 show, in phantom, the outlines of a tank hull 2. As here shown, the tank faces to the left of the drawing and is provided with a conventional turret 4 and a conventional gun 6 of optional size. Such military vehicles are conventionally provided with tracks, and such tracks are here shown in phantom at 8 and 10 on the left and right sides, respectively.

The vehicle is supported on its tracks by conventional road wheels, five being here shown on each side. The four corner wheels are shown at: 12 and 14, left front and left rear, respectively; and 16 and 18, right front and right rear, respectively. Intermediate road wheels 20, three in number on the vehicle here shown, are provided on the left side between corner wheels 12 and 14, and three intermediate road wheels 22 are provided on the right side between corner wheels 16 and 18.

The tracks of track-laying vehicles may be driven from the front or from the rear. Here illustrated are drive sprockets 24 at the rear of the tank, and idler wheels 26 at the front. Idler wheels 26 are conventionally mounted to have a track tension control capability; tension control devices are of many types and are not detailed here: it suffices here to note that idler wheels 26 in the illustrated embodiment are eccentrically mounted as shown generally at 28 by any suitable conventional means adapted to exert a forward bias on wheels 26 to keep the tracks tight.

In this invention, the road wheels are resiliently suspended by torsionally deflected elongated devices, each of which undergoes elastic deformation in the angular sense to allow one end of a roadarm, carrying a road wheel, to move with a substantial vertical component to provide the conventional up-and-down movement of a resiliently suspended wheel.

Corner wheels 12, 14, 16 and 18 are suspended by means of elongated devices 32, 34, 36 and 38, respectively. Intermediate wheels 20 and 22 are suspended by means of elongated devices 40 and 42 respectively. The connecting medium is a roadarm. Thus, wheel 12 is rotatably mounted in one end of roadarm 44, of which the other end is connected to elongated torsional device 32 in a manner to be detailed below. Similarly, a roadarm 46 supports corner wheel 14 on elongated device 34, while corner wheels 16 and 18 are supported on elongated devices 36 and 38 by roadarms 48 and 50 respectively.

4

In like manner, intermediate wheels 20 are supported on elongated torsional devices 40 by means of roadarms 52, and intermediate wheels 22 are supported on elongated torsional devices 42 by means of roadarms 54.

As indicated above, one end of each elongated torsional device is connected with its associated roadarm at the pivot axis of the roadarm, as will be understood by those skilled in the art. Each elongated device then extends across the axis of movement, longitudinal axis X — X (FIG. 2), of the vehicle and is anchored at the opposite side of hull 2 from its connected wheel. Specifically, corner wheels 12 and 14 on the left side of the vehicle have their respective elongated devices 32 and 34 secured in anchor assemblies 56 and 58 respectively on the right side of the vehicle; intermediate wheels 20, which are also on the left side, are suspended on devices 40 which are secured in anchor assemblies 60, on the right side.

Right side corner wheels 16 and 18 are suspended on elongated torsional devices 36 and 38 which are secured in anchor assemblies 62 and 64 respectively, on the left side of the vehicle, and right side intermediate wheels 22, in turn, have their torsional devices 42 anchored on the left side of the vehicle as shown at 66.

As will be detailed below, all of the torsional device anchors are held in pivotable, or oscillatable, mountings, and height control arms are connected with the anchor assemblies, an arm for each anchor. Of the views illustrating the vehicle as a whole, the height control arms are best seen in FIG. 1, wherein the control arms on the left side, controlling the wheels on the right side, appear in side elevation, and it will be understood by those skilled in the art that the height control arms disposed on the right side of the vehicle, which control the wheels on the left side, are of similar construction, appearance, and function. In FIG. 2, only the tops of the control arms show.

Specifically, the control arm for right front corner wheel 16 is seen in FIG. 1, on the left side of the vehicle, at 68 in side elevation, and a top plan thereof appears in FIG. 2. Similarly, the control arm for right rear corner road wheel 18 appears at 70 of FIGS. 1 and 2, and the height control arms for intermediate road wheels 22 on the right side of the vehicle are shown at the left side at 72.

In like manner, left side road wheels 12, 14, and 20 are suspended on torsional devices 32, 34, and 40, respectively, as aforesaid, which torsional devices are anchored at 56, 58, and 60 respectively, for which height control arms 74, 76 and 80, respectively, are provided.

To provide for simultaneous control of all road wheels on one side, the several height control arms are connected by actuating means. Thus, first actuating means 82 connects the height control arms 74, 76, and 80 on the right side of the vehicle, to enable operator control of the height of the left side of the vehicle. Motor means, here shown as a fluid pressure motor, operates the connection. Thus, specifically, a hydraulic ram 84 is connected to first actuating means 82. As will be understood by those skilled in the art, the first actuating means 82 is so connected with ram 84 that means 82 is loaded in tension rather than in compression.

Similarly, height control arms 68, 70, and 72 are connected by second actuating means 86, which in turn is connected to be operated by a hydraulic ram 88. As best seen in FIG. 1, the operating connection between ram 88 and second actuating means 86 is conveniently accomplished by a link 90. Another, similar link 92 joins ram 84 and first actuating means 82.

Reference is now made to FIG. 3 for a more detailed discussion of certain aspects of the invention. In FIG. 3 it can be seen that each torsional device is anchored in an anchor assembly, one of which is referenced generally as 60. The anchor assembly is secured in a suitable bore in tank hull 2 (or other vehicle frame structure) by a suitable number of threaded members, one of which appears at 102 as a cap screw.

Cap screws 102 pass through a flange 104 in a bearing block 106 and engage hull 2. Any suitable (preferably antifriction) bearing, shown symbolically at 108, is held by bearing block 106 to provide pivotable support for an anchor element 110 having a stepped diameter configuration as seen in FIGS. 3 and 4, namely two diameters both externally and internally, both internal diameters being splined. Means are provided to pivot each torsion bar anchor 110 about the axis of its torsion bar, that means being in FIG. 3 the height control arm 80 secured to the exterior of the larger diameter of anchor 110.

Bearing block 106 is provided with an end closure 112 which is centrally apertured to receive a cap screw 114 which holds bearing block 106 and anchor 110 together to form what is hereinabove referred to as an anchor assembly — in FIG. 3 shown as anchor assembly 60.

Anchor assembly 60 is part of elongated torsional device 40, the remainder of which will now be described in detail. A torsion bar 116 is splined at both ends 118 and 120. Spline 118 mates with the internal spline of the smaller diameter of anchor 110. The internal spline of the larger diameter of anchor 110 mates with an external spline on the left (as seen in FIG. 3) end of a torque tube 122. A similar external spline at the opposite end of tube 122 mates with an internal spline in a lost-motion device 124; device 124 is a torus having a relatively short longitudinal dimension. The aforesaid internal spline of device 124 occupies approximately half of the longitudinal dimension, and the remaining half is provided with an arcuate recess 126 (FIG. 5) which subtends an angle $x$. Recess 126 preferably occupies both ends of a diameter intersecting it and thus is in effect a two-part recess as is readily apparent from a study of FIG. 5.

A spindle 128 surrounds the right end of torsion bar 116 and is internally splined to mate with spline 120 of bar 116. Spindle 128 also engages lost-motion device 124 by means of a two-part arcuate lug 130 occupying two-part recess 126. Lug 130 subtends an angle $y$, and as can be seen in FIG. 5, $x > y$; in this embodiment, the relationship is approximately $x = 2y$, but the precise ratio of $x$ to $y$ is a design consideration depending on a number of factors, such as the desired wheel deflection at the lower spring rate of torsion bar 116 before tube 122 is engaged, the height range between minimum and maximum ground clearance, what the assumed ground clearance is for optimum or cruising conditions, and the like.

Spindle 128 is rotatable in a load-bearing element 132 by means of antifriction bearings 134 and 136. Element 132 is mounted in hull 2 and is secured in place by threaded members (cap screws), one of which is shown at 138.

Spindle 128, at its right end as seen in FIG. 3, is secured in roadarm 52 by any suitable conventional means that will assure no relative slip, such as splines and a shrink fit, a shrink fit keyed or dowelled at the contact surface, etc.

Referring now to FIG. 4, the anchor assembly 56 is substantially identical to and interchangeable with anchor assembly 60, so will not be detailed again. Similarly, torsion bar 116, torque tube 122, and lost motion connection 124 are the same as in FIG. 3.

The right end of FIG. 4, as well as FIG. 6, show details of a damping device which is an adaptation of a damping device disclosed and claimed in U.S. Pat. No. 3,504,932 to Kozowyk and Sinclair, issued Apr. 7, 1970 and listed as Reference G in the above listing of prior art. A prime difference between the patented device and the one here shown is that the valves shown at 38 in FIGS. 3 and 4 of the patent are, in the damper shown in FIGS. 4 and 6 of the structure herein disclosed, located or "packaged" outside the damper chamber, as will be understood by those skilled in the art.

Detailing now the structure of FIGS. 4 and 6, a spindle 140 at its left end engages lost-motion device 124, and at its right end engages roadarm 44, in much the same way that spindle 128 in FIG. 3 engages its device 124 and roadarm 52. Spindle 140 is rotatably mounted in antifriction bearings 142 and 144. Also at its right end, spindle 140 is internally splined to mate with spline 120 of torsion bar 116.

Bearing 142 is carried in bearing plate 146, and plate 146 is secured to hull 2 by cap screws 148. A damping device 150 is the aforesaid adaptation of the device of U.S. Pat. No. 3,504,932 referred to above. Device 150 consists of a stator and a rotor. The stator here shown comprises end members 152 and 154, and a vane-bearing ring 156. Ring 156 is disposed between end members 152 and 154 and carries inward-extending vanes 158. The two end members and the ring are held together on bearing plate 146 by a plurality of bolts 160.

The rotor referred to is shown at 162 and has a splined connection with spindle 140, as shown at 164. Vanes 166 on the rotor move with the rotor as its connected roadarm oscillates. The tips of vanes 158 and 166 are suitably packed against leakage, as will be understood by those skilled in the art.

Reference is now made to FIGS. 8 and 9 for a discussion in detail of the hydraulic and electrical systems as used in this invention. The hydraulic rams 84 and 88 of FIGS. 1 and 2 are shown in more detail in FIGS. 8 and 9, but it will be understood that the rams, even as shown in FIGS. 8 and 9, are illustrated to show function rather than design details. Rams 84 and 88 are refinements of the hydraulic ram disclosed in U.S. Pat. No. 3,371,940 to Sinclair and Kozowyk, issued Mar. 5, 1968, and referenced as item C in the prior art listed hereinabove.

Each of rams 84 and 88 comprises a cylinder and a piston, of which the cylinder is made up of an actuation chamber 172 and a lock chamber 174, and of which piston 176 and its connected piston rod 178 are the same diameter. The outer end of the piston rod is provided with a bifurcated connector 180 which is pivotally joined with the link 90 or 92 of rams 88 and 84 respectively; see FIGS. 1 and 2.

Lock chamber 174 is here shown as double-walled, and the inner surface of the inner wall, to which unlocking pressure is applied, is provided with alternating grooves 182 and ridges 184. The ridges are notched as at 186 (FIG. 9) to provide ready access throughout the chamber to the unlocking pressure. Midway of its length, chamber 174 is provided with a pressure supply groove 188 which is connected with a hydraulic pressure connection 190. A hydraulic pressure connection 192 is also provided for each actuation chamber 172.

A primary source of fluid under pressure is provided by a constant-pressure, variable-displacement pump 194 connected as indicated at 196 to be driven by a conventional power source such as a vehicle engine 198. Pump 194 is connected to receive oil from reservoir 200 through conduits 202 and 204, and a strainer 206.

Pump 194 delivers oil under pressure to a check valve 208 in a conduit 210, in which a filter 212 is also disposed. For diagramming convenience, conduit 210 is shown as delivering through a junction 214 and a check valve 216 to a T 218. Also connected with junction 214 are a gage 220 and a relief valve 222.

From T 218, a conduit 224 connects with the pump port 226 of a closed-center valve 228. Valve 228 has: a housing 230; a three-position valve element 232 having segments 232a, 232b, and 232c; an actuator rod 234; a switch operator 236; a bifurcated connector 238 on rod 234; a pressure port 240; a tank (or reservoir) port 242; and a feedback connector 244 on housing 230. Valves with feedback, or "follow-up", as it is sometimes called, are commonplace, off-the-shelf items, and no effort is herein made to detail the feedback features of valve 228, except to note that it is a feedback type of valve, indicated by the connecting means 244 (herein connector 244). Schematically, it will be understood by those skilled in the art that movement of ram 84, which is controlled by valve 228, will be "fed back" to move housing 230 in the same direction as valve element 232 until element 232 and housing 230 are again centered with respect to each other.

Connector 238 is associated with operator-operable control means 246 by any suitable conventional linkage shown schematically at 248. Control means 246 is illustrated functionally in FIG. 8 as having a lever, such as a handle or a pedal, at 250, a pointer 252, and a dial 254. Lever 250 has an infinite number of settings. As here shown, dial 254 is provided with suitable indicia such as L for "low", H for "high", and any desired characters in between to indicate ground clearance between the minimum and maximum heights.

Pressure port 240 of valve 228 delivers to a connected conduit 256 which in turn is connected to pressure connection 192 of actuation chamber 172 of hydraulic ram 84. It will be noted that, as here shown, ram 84 is single-acting, utilizing pressure to lift the vehicle (increase ground clearance) and relying on vehicle weight to lower the vehicle (decrease ground clearance). To lift, segment 232a of valve 228 must occupy the central position in valve housing 230, while to lower, segment 232c must be in the central position. When element 232 is in the position shown in FIG. 8, all three ports of the valve are blocked and fluid is trapped in ram 84.

A conduit 262 is connected to above-referenced T 218 and to another T 264. A conduit 266 connects T 264 with the pump port 268 of a control valve 270. Because valve 270 is identical to, and interchangeable with, valve 228, all functionally illustrated mechanical details of valve 270 are given the same reference characters as for valve 228, above. Only the fluid ports are assigned different numbers.

Accordingly, the tank port 272 of valve 270 is connected to discharge hydraulic fluid to reservoir 200, and the pressure port 274 is connected with the hydraulic pressure connection 192 of ram 88 by means of a conduit 276. Connector 238 of valve 270 is conventionally connected with another operator-operable control means 278 by linkage shown schematically at 280.

Functionally, and usually mechanically, control means 246 and 278 will be identical and interchangeable. Accordingly, the operating lever, the pointer, and the dial of the two control means 246 and 278 have been given the same reference characters. Moreover, because control means 246 is described in detail above, such a description of control means 278 will not be repeated.

The above-referenced T 264 is connected by a conduit 282 with another T 284, which is connected with operator-operable valves 286 and 288 by conduits 290 and 292 respectively. As is shown by the functional illustration of valves 286 and 288, and a third such valve 294 to be referred to again below, valves 286 and 294 are "normally-open" valves, while valve 288 is of a "normally-closed" type. All three valves 286, 288, and 294 have only two operating positions, i.e. "open" or "closed", and are operable from either position to the other position by substantially identical (as here shown) levers 296, 298, and 300 respectively.

A conduit 302 connects operator-operable valve 286 with a remotely controlled (solenoid-operated) valve 304. A conduit 306 connects valve 288 with a T 308. A conduit 310 connects T 308 with aforesaid valve 304 through a T 312 which serves to connect conduit 310 with a gage 314.

Valve 294 is connected with valve 304 by a conduit 316, and is also connected to reservoir 200.

Above-referenced T 308 is connected by means of a conduit 318 with the pressure connections 190 of lock chambers 174 of rams 84 and 88, the ram 88 connection being by way of a T 320.

DESCRIPTION OF SECONDARY PRESSURE SOURCE

If engine 198 which drives pump 194 is also the vehicle power plant, and if that engine fails, then of course the vehicle is down or disabled. In such an event, vehicle height is fixed by the position of rams 84 and 88 at the time of engine failure. That height might not lend itself to easy recovery of the vehicle by salvage troops for return to a repair facility, so an emergency hydraulic system is desirable to allow such troops to change ground clearance of the disabled vehicle.

Moreover, even if engine 198 is not disabled, drive 196 could be "knocked out" by enemy action, accident, or some other cause, in which case emergency hydraulic pressure would be appreciated by the crew. An operator-operable pump 322 is connected to receive fluid via conduit 204, discharging fluid under pressure to conduit 210 through a check valve 324 and a T 326 in a conduit 328, T 326 being disposed in conduit 210 between check valve 208 and filter 212. A lever 330 is movable by the operator to produce a small volume of oil at whatever pressure is needed to operate the system.

THE ELECTRICAL SYSTEM

A conventional electric power source 332, which may be a vehicle storage battery is shown connected to each of two switches of the center-off, double-throw type. One such switch is shown at 334 for valve 228 and the other at 336 for valve 270. Each switch comprises: a pair of fixed contacts 338 and 340; and an actuating lever 342, engaging at its one end the switch operator 236 of its associated valve, carrying at its other end a movable contact 344, and pivotally mounted at 346.

The two fixed contacts of each switch are permanently electrically connected with one switch terminal and the movable contact is permanently connected with the other switch terminal. One of those terminals is connected with the battery and the other with an operating coil 348 of aforesaid solenoid-operated valve 304.

More specifically, in the embodiment here shown, the two fixed contacts of switch 334 are connected with the battery by an electrical conduit 350, and movable contact 344 of switch 334 is connected with one terminal of coil 348 by an electrical conduit 352. The two fixed contacts of switch 336 are connected with the battery by an electrical conduit 354, and movable contact 344 of switch 336 is connected with one terminal (the same terminal as is connected with switch 334) of coil 348 by an electrical conduit 356.

It will be apparent that valve 304, with coil 348 deenergized, is positioned to block fluid pressure to the lock chambers of rams 84 and 88 and to vent those chambers to tank. Moreover, it will be apparent that movement of either valve 228 or 270 in either direction (i.e., to raise or lower its associated wheels), will unlock the lock chambers of both rams 84 and 88.

CONTROLS AND AN OPERATOR'S STATION

As here shown, no operator's station or cockpit is illustrated with the operator-operable controls grouped there. It will suffice to indicate to persons skilled in the art that the following elements are located at the operator's station so as to be readily accessible to the operator: the two valve control means 246 and 278; lever 330 of emergency pump 322; levers 296, 298, and 300 of valves 286, 288 and 294, respectively; and the two gages 220 and 314.

Preferably, gage 220 will be calibrated to indicate actual pressure above atmospheric. Gage 314 desirably will be color-coded, having a green band range below the unlocking pressure for chambers 174 and a red band range above that pressure. The rationale behind such indicia for gage 314 is that green is a "go" signal, indicating that rams 84 and 88 are locked or "safe", while pressure in the red range shows an unlocked condition of the rams which might be dangerous if the rams 84 and 88 were operated inadvertently to change the ground clearance adversely.

Because the precise unlocking pressure may be difficult to predetermine, it may be advisable to provide a short "twilight zone" or some other color such as yellow between the green and red bands.

It will of course be understood by those skilled in the art that the usual vehicle controls such as throttle, brakes, steering, and the like will also be at the operator's station, but such arrangements are conventional and need not be detailed here.

OPERATION

Routine Height Control

Let it be assumed that the vehicle is at its lowest silhouette (minimum ground clearance), and the operator wishes to increase the ground clearance. He moves either or both valve control means 246, 278 until the pointer indicates the desired level. Such actuation of either or both valve control means will move the associated valve element 232 to the right as seen in FIG. 8, until segment 232a is centered in housing 230.

Such actuation closes the associated switch(es) 334, 336 by movement of contact 344 into electrical engagement with contact 338. Note that closing either of switches 334, 336 completes an electric circuit between battery 332 and coil 348 of solenoid valve 304, by way of wires 350 and 352 for switch 334, and by way of wires 354 and 356 for switch 336. Energization of coil 348 shifts the movable element of valve 304 to put conduit 302 into communication with conduit 310.

The lock chambers of rams 84 and 88 thereby become exposed to the pressure at the delivery port of main pump 194, as follows: conduits 210, 262, 282, 290, 302, valve 304, and conduits 310 and 318 to the pressure connections 190 of the lock chambers 174. Chambers 174 thereupon expand until ridges 184 no longer engage piston rods 178.

Actuation chambers 172 of rams 84 and 88 have meanwhile become connected with the delivery port of pump 194 as follows: for ram 84 — conduits 210, 224, segment 232a of valve 228, and conduit 256 to pressure connection 192 of ram 84; for ram 88 — conduits 210, 262, 266, segment 232a of valve 270, and conduit 276 to pressure connection 192 of ram 88. Pistons 176 move in response to line pressure until the feedback mechanism re-centers segment 232b in housing 230.

As pistons 176 move to the right as seen in FIG. 8, first and second actuating means 82 and 86 move to the right as seen in FIGS. 1 and 2, oscillating their connected anchors counterclockwise as seen in FIG. 5. Although element 110 is above the plane of the drawing in FIG. 5, those skilled in the art will visualize the relationship of the elements to each other by a study of FIG. 3 in conjunction with FIG. 5. Anchor element 110 is spline connected with bar 116 and tube 122. Although tube 122 is also above the plane of the drawing (FIG. 5), lost-motion device 124 is splined to tube 122 and must turn with the tube.

As tube 116 is torqued counterclockwise, FIG. 5, to lift the vehicle relative to the ground, the left end of bar 116 will turn through a greater arc than the right end of the bar. There is no torsional load at this time on tube 122, so that device 124 turns counterclockwise at the same rate as does bar 116 at spline 118. Moreover, spindle 128 is splined to the right end of bar 116, and thus the two-part lug 130 at the left end of spindle 128 turns at the same rate as spline 120. Since device 124 turns counterclockwise at the rate that spline 118 turns, lug 130 turns at the rate that spline 120 turns, and the torsional deflection in shaft 116 causes spline 120 to lag behind spline 116, the arcuate gaps or empty spaces which appear in FIG. 5 as arcs subtending an angle Z will grow smaller.

It will be apparent to those skilled in the art that a system can be designed in which lifting the vehicle to maximum ground clearance uses up all of the arcuate spaces — i.e., angle $z = 0$. In such a system, wheel deflection at maximum ground clearance would be resisted by tube 122 as well as bar 116, and the variable spring rate feature would be lost at maximum ground clearance. This will be described in greater detail below.

As the feedback feature of each valve 228, 270 recenters the valve elements, each switch 334 and 336 opens, coil 348 is deenergized, valve 304 returns to the position shown, and lock chambers 174 are vented to tank through valve 294, and lock the piston rods in place. In routine operation, valves 286, 288, and 294 remain untouched.

To lower the vehicle and thus decrease ground clearance, valve control devices 246, 278 are moved so as to shift segments 232c to the mid-position of housing 230, pivoting contacts 344 of switches 334 and 336 into engagement with contacts 340, and again operating valve 304 to unlock the lock chambers 174. Actuation chambers 176 are then able to dump fluid to tank via tank ports 242 and 272 of valves 228 and 270, respectively, whereupon the vehicle settles to the height indication selected, when feedback again centers valves 228, 270 and fluid is trapped in actuation chambers 172. Coil 348 is deenergized as before and piston rods 178 are seized and locked.

It will be evident to those skilled in the art that either side of the vehicle may be raised or lowered independently of the other side, to compensate for prolonged operation on a side slope.

Height Control by Emergency Pump

Let it now be assumed that the drive connection 196, between engine 198 and pump 194, is disabled so that loss of primary pressure ensues. The fail-safe feature of rams 84 and 88 assures that vehicle height will not diminish because of leakage in that part of the system which is on the downstream side of check valve 208, as well might happen if height and ground clearance stability depended on no loss of fluid trapped in actuation chambers 172.

However, at the time of failure of drive 196, vehicle height might be a maximum and it might be desirable to lower the vehicle to take advantage of a lower profile. The mere operation of valve control means 246, 278 to lower the vehicle will not accomplish the objective because the lock chambers hold piston rods 178 at the attained position. Lever 330 is accessible to the operator and can be actuated to build up sufficient pressure to effect release of piston rods 178.

The operator actuates lever 330 and keeps an eye on gage 314. As soon as gage 314 indicates that system pressure is in the red range, he operates one or both of valve control means 246, 278 to select the desired ground clearance. Assuming that electric power is still available, coil 348 operates valve 304, and lock chambers 174 are connected to system pressure. If gage 314 then shows a drop in system pressure below the red range, the operator gives pump 322 a few more strokes by means of lever 330 until the required red band appears again on gage 314, and the lock chambers again relinquish their grip on rods 178, allowing fluid to bleed from chambers 172 until feedback re-centers valves 228 and 270. Fail-safe takes over again, as before.

It will be evident to those skilled in the art that ground clearance can also be increased by the operation of pump 322, although it would take some additional strokes of lever 330.

Electrical Failure

Military tanks are, of course, often disabled during combat, but the disablement is often of such a nature as to merely immobilize the tank. Many such tanks are "picked up" by recovery crews working with tank carriers such as those disclosed and claimed in U.S. Pat. Nos. 3,191,962 and 3,228,547 issued June 29, 1965 and Jan. 11, 1966 to John E. Coordes and assigned to the United States of America. There is a good chance that a tank disabled in combat will be at minimum height to offer as small a target as possible, and yet recovery of the tank in that condition might be difficult because of the minimal ground clearance.

We have discussed above the operation of our height control in the event of loss of hydraulic pressure in the primary source, but wherein electric power was still present in the tank. In the field, disabled equipment is often cannibalized of workable components, and the storage battery is one that is easily removed, so a recovery crew could well wish to alter the ground clearance of a disabled tank that had been robbed of its battery.

It will be understood by those skilled in the art that other circumstances could deprive the height control system of battery power without requiring that the battery be missing. If for any reason the system alone lacks electric power, even though the rest of the tank is operable in whole or in part, the invention here disclosed and claimed provides a fall-back or alternative means of operating the height control system without electric power. This alternative concerns only the presence or absence of electric power to operate valve 304, which controls the application of hydraulic pressure to the lock chambers 174 of rams 84 and 88. Unless those chambers are unlocked, pistons 178 are tightly gripped at the ground clearance existing at the time of last adjustment.

Accordingly, it will now be assumed that there is no electric power to operate valve 304, and that there is operating pressure in conduit 210 and that the system down-stream of conduit 210 is operative save for the posited electrical failure.

With pressure in conduit 210, the operator moves operating levers 298 and 300 of valves 288 and 294 respectively from the positions shown in FIG. 8 to their other operating position. That operation closes valve 294, and opens valve 288. With valve 294 closed, the vent to tank through that valve is shut off. With valve 288 open, system pressure, present in conduits 282 and 292, is also applied to conduits 306, 310, and 318, and thus to gage 314 and pressure connections 190 of rams 84 and 88. Since adequate operating pressure is assumed, gage 314 will read "Red" or "Unlocked", depending on how it is marked, and lock chambers 174 will be unlocked.

The operator then moves valve control means 246 and 278 to the desired ground clearance indication, and the system functions as above. Upon attainment of the desired ground clearance, the operator again shifts handles 298 and 300 to the positions shown, whereupon the pressure in lock chambers 174 is reduced to the tank pressure through conduits 318, 310, 316 and valve 294, allowing ridges 184 once again to grip the piston rods 178, and the rams are back in "fail safe" condition.

Reference is now made to valve 286 which is connected to permit or prevent communication between conduits 290 and 302. Since valve 286 is normally open, it is shown as connecting conduits 290 and 302. It will be noted that the passage through the movable valve element is narrow at its normally upstream side and wide at its normally downstream side, "normally" meaning how the valve functions when all systems are "go". It is further notable that valve 286 also has a connection to reservoir 200 which is blocked in the position shown. When valve 286 is operated by movement of lever 296 counterclockwise through 45°, communication with conduit 290 is blocked, and conduit 302 is connected with reservoir 200.

Valve 286 is necessary or at least desirable in case solenoid valve 304 sticks in its energized position. In that event, without valve 286, chambers 174 of rams 84 and 88 would be continuously pressurized and thus unlocked, and the fail-safe feature would be lost. Thus, if, after the change in vehicle height has been accomplished, gage 314 still shows "Red", the operator will suspect that valve 304 is malfunctioning. The operator then moves lever 296 to vertical (the valve-closed position), whereupon conduit 302 is vented to tank, allowing lock chambers 174 to return to the fail safe condition.

If it should turn out that valve 304 is functioning but gage 314 is not, the operation of valve 286 will nevertheless have done no harm. However, in that event, the operator will necessarily operate valve 286 to its illustrated position when chambers 174 of rams 84 and 88 need to be unlocked.

The Variable Spring Rate

Reference is now made to the variable spring rate feature and its function, with particular reference in detail to FIGS. 3, 5 and 7.

As is explained above in the description of the operation of the invention for "Routine Height Control", spindle 128 turns with spline 120 on torsion bar 116, and lost-motion device 124 turns with spline 118 on bar 116. By hypothesis, it is here assumed that FIG. 5 shows the relationship of the parts with the vehicle lightly loaded, and it is now purposed to explain what happens when the vehicle is much more heavily loaded.

In the posited circumstances, torsion bar 116 will turn clockwise as seen in FIG. 5, and because of the torsional "wind-up" of bar 116 from spline 120 to spline 118, it will be evident that spline 120 will turn faster than spline 118. That means that, starting with the relationship shown in FIG. 5, as the tank is more heavily loaded, lost-motion device 124 and spindle 128 will both turn clockwise, but device 124 will lag behind spindle 128. Consequently, two-part lug 130 will move clockwise relative to and within the two-part arcuate recess 126.

If the loading continues until the entire "slack" is taken up in lost-motion device 124 (i.e., angle z in FIG. 5 becomes zero), further loading will cause the two-part lugs 130 to engage the end of the recess 126 so as to begin to stress torque tube 122. Moreover, even if the increase in loading stops at the point that z becomes zero, then when the associated road wheel goes up over a bump on the supporting surface so as to effect elastic deformation of torsion bar 116, torque tube 122 is necessarily also rotated and is therefore also subjected to elastic deformation.

For another view of what happens, reference is made to FIG. 7, where curve I shows the relationship of wheel load to road arm rotation for a conventional torsion spring designed for the vehicle illustrated, and curve II shows that relationship for the dual rate torsion spring of the invention here disclosed and claimed. Curve II is concave downward from the point of origin to the point that angle $z = 0$, and for further roadarm rotation, curve II is substantially straight and much steeper, showing the influence of the added torsional resistance of tube 122.

The advantages of the dual rate suspension of this invention are evident from a study of FIG. 7, where $A_s$ is the roadarm angle for a static position, vehicle lightly loaded condition; $A_c$ is the roadarm angle at which the bump stop is engaged for the vehicle illustrated equipped with a conventional torsion spring; $A_{zo}$ is the roadarm angle at which the torque tube is engaged in the dual rate system of this invention; and $A_{dr}$ is the roadarm angle at which the bump stop is engaged in a dual rate spring vehicle.

In a vehicle designed for a conventional torsion spring, the design necessarily is a compromise between the desired performance characteristics of the suspension when the vehicle is minimally loaded, and performance when the vehicle is heavily loaded. Optimally, the suspension is "soft" (low spring rate) when the vehicle is lightly loaded, and "stiff" or "hard" (high spring rate) when the vehicle is heavily loaded. The compromise shown in curve I actually approaches the hard or stiff rate needed at maximum loads, which will give an undesirably rough ride at low vehicle loads. The result is excessive fatigue and reduced combat efficiency of the crew; as well as increased wear and tear on the equipment with a higher incidence of equipment failures.

In a vehicle equipped with the dual rate suspension of this invention, a soft ride is possible with a lightly loaded vehicle as shown by curve II between $A_s$ and $A_{zo}$ roadarm angles, and a firm ride (hard or stiff spring) is provided with a heavily loaded vehicle as shown by that part of curve II between $A_{zo}$ and $A_{dr}$ roadarm angles.

A further advantage of the dual rate suspension of this invention is apparent from FIG. 7 in the fact that the dual rate spring permits a higher wheel load than a conventional torsion spring. Since "wheel load" includes the load due to acceleration caused by impact, it follows that the dual rate suspended vehicle can carry the same load faster over a given rough terrain than if that vehicle were provided with a conventional torsion spring.

For comparison purposes, we have added curve III, which shows performance characteristics of a typical hydropneumatic spring.

We wish it to be understood that we do not desire to be limited to the exact details of construction shown and described for obvious modifications will occur to a person skilled in the art.

It is claimed:

1. In a vehicle, a wheel suspension system comprising an elongated device including coaxial tube and bar torsion elements joined at one end and relatively angularly displaceable at the other end and having:
   a. means to rotate the joined ends to vary vehicle height
      i. in an infinite number of increments, and ii. throughout a range between maximum vehicle height and minimum vehicle height; and b. means operative throughout at least part of said range and responsive to vehicle load to vary the spring rate of the suspension means including a two-element lost-motion device of which one element engages the torsion tube and the other element engages the torsion bar.

2. A vehicle as in claim 1, wherein the elongated device comprises means to displace the bar angularly through a first range without displacing the tube, and to displace both bar and tube angularly through a second range.

3. A vehicle as in claim 2, wherein the means to displace the elongated device through said two ranges comprises a lug in engagement with a recess.

4. A vehicle as in claim 3, wherein the arc subtended by the lug is smaller than the arc subtended by the recess.

5. In a vehicle as in claim 4, said height varying means comprising a hydraulic ram having a cylinder, a piston rod movable in the cylinder, and pressure responsive means on the cylinder engageable with said rod for holding the rod against movement relative to the cylinder upon reduction of hydraulic pressure to a predetermined minimum.

6. In a vehicle as in claim 1, said height varying means comprising a hydraulic ram having a cylinder, a piston rod movable in the cylinder, and pressure responsive means on the cylinder engageable with said rod for holding the rod against movement relative to the cylinder upon reduction of hydraulic pressure to a predetermined minimum.

7. In a vehicle having a plurality of road wheels, means to vary the height of the vehicle comprising:
   a. a torsion bar for each wheel and connected to be elastically deformed for resilient suspension of its associated wheel;
   b. pivotable anchor means for each torsion bar;
   c. means for pivoting each torsion bar anchor about the axis of its associated torsion bar;
   d. hydraulic motor means connected to the pivoting means and having
      i. a housing element,
      ii. an actuator element movable relative to the housing element in response to fluid pressure, and
      iii. lock means to hold the housing and actuator elements against relative movement in the absence of fluid pressure and releasable in response to fluid pressure;
   e. a source of hydraulic fluid under pressure;
   f. means connecting said source with the motor means, comprising
      i. operator-operable valve means for selecting vehicle height,
      ii. other valve means for controlling fluid pressure in the lock means,
      iii. electrical means to actuate said other valve means in response to operation of the operator-operable valve means, and
      iv. a source of electric power for operating the electrical means; and
   g. further valve means associated with the means connecting said source and operator-operable valve means in such an emergency as would arise in the event of failure of the electric power source.

8. Vehicle height control means as in claim 7, wherein said further valve means comprises:
   a. a normally-open valve in a fluid pressure conduit between said source of fluid under pressure and said other valve means;
   b. a normally-closed valve between said source of fluid under pressure and said lock means; and
   c. a second normally open valve between said other valve means and a fluid reservoir for said source of fluid under pressure.

9. Vehicle height control means as in claim 8 wherein:
   a. said source of hydraulic fluid under pressure depends upon a power source carried by the vehicle; and
   b. a second source of hydraulic fluid under pressure which is independent of the power source carried by the vehicle.

10. Vehicle height control means as in claim 7 wherein:
    a. said source of hydraulic fluid under pressure depends upon a power source carried by the vehicle; and
    b. a second source of hydraulic fluid under pressure which is independent of the power source carried by the vehicle.

11. Vehicle height control means as in claim 7, wherein said further valve means comprises:
    a. a normally-closed valve between said source of fluid under pressure and said lock means; and
    b. a normally open valve between said other valve means and a fluid reservoir for said source of fluid under pressure.

12. Vehicle height control means as in claim 11 wherein:
    a. said source of hydraulic fluid under pressure depends upon a power source carried by the vehicle; and
    b. a second source of hydraulic fluid under pressure which is independent of the power source carried by the vehicle.

* * * * *